United States Patent [19]

Scholz et al.

[11] 4,422,910
[45] Dec. 27, 1983

[54] METHOD OF MANUFACTURING ACICULAR GOETHITE

[75] Inventors: Heinz Scholz, Kelmis-Hergenrath, Belgium; Wolfgang Schnitker; Ernst Klein, both of Roetgen, Fed. Rep. of Germany

[73] Assignee: U.S. Philips Corporation, New York, N.Y.

[21] Appl. No.: 403,953

[22] Filed: Aug. 2, 1982

[30] Foreign Application Priority Data

Oct. 19, 1981 [DE] Fed. Rep. of Germany ....... 3141421

[51] Int. Cl.$^3$ .............................................. C25B 1/00
[52] U.S. Cl. ...................................... 204/96; 204/130
[58] Field of Search .................................. 204/130, 96

[56] References Cited

U.S. PATENT DOCUMENTS 3,466,234 9/1969 Cohen et al. .................. 204/96

*Primary Examiner*—R. L. Andrews

*Attorney, Agent, or Firm*—Marc D. Schechter

[57] ABSTRACT

A suspension of a poorly water-soluble iron (II) containing compound in a liquid which consists substantially of water and is preferably alkaline is oxidized, to form goethite crystals and particles. The crystals and particles are filtered off, washed and dried. From a thermodynamic point of view, "more monoenergetic" particles are obtained than particles manufactured according to conventional production processes, when electrolyte oxidation processes are used, in particular, when the oxidation to goethite occurs entirely or partly by a (preferably periodic) electrolysis process. The electrolysis process may be combined with oxidation by an oxidation agent, preferably an oxidizing gas or gas mixture. Furthermore, it is possible to first oxidize the iron (II) containing compound completely to goethite by an oxidation agent, preferably an oxidizing gas or gas mixture, and to then subject the resulting suspension to an electrolytic oxidation after-treatment which preferably occurs periodically.

20 Claims, 10 Drawing Figures

METHOD OF MANUFACTURING ACICULAR GOETHITE

BACKGROUND OF THE INVENTION

The invention relates to a method of manufacturing acicular goethite by forming a suspension of a poorly water-soluble iron (II) compound in a liquid consisting essentially of water oxidizing the iron to form goethite crystals, and filtering off, washing and drying the goethite crystals.

Of the four known crystalline iron (III) oxide hydrate modifications ($\alpha$-, $\beta$-, $\gamma$-, $\delta$-) of the chemical formula FeOOH, goethite ($\alpha$-FeOOH) is the most stable and least soluble phase (solubility product $[Fe^{+++}] \cdot [OH^-]^3 = 10^{-44}$ mol$^4$l$^{-4}$). For structural reasons the crystallite formation of the goethite is acicular in the direction of the c-axis. $\alpha$-FeOOH serves as a starting material for the manufacture of magnetic powders. Such magnetic powders are used in the manufacture of carriers for magnetic recording and reproducing of data, audio and video signals. The magnetic powders may consist of acicular maghemite, $\gamma$-Fe$_2$O$_3$, or of acicular iron. They are manufactured by reducing acicular geothite pseudomorphously (that is without the particles loosing their acicularity) to magnetite, Fe$_3$O$_4$, and then either oxidizing the magnetite to acicular $\gamma$-Fe$_2$O$_3$ or further reducing it into acicular iron.

U.S. Pat. No. 3,288,563 (corresponding to German Offenlegungsschrift No. 1447134) describes a method of manufacturing a powder for magnetic recording. The powder consists of magnetic iron oxide, $\gamma$-Fe$_2$O$_3$. In the method, an iron (II) compound having a low water-solubility is suspended in an alkaline liquid consisting essentially of water with an (OH)$^-$ ion concentration of more than 0.2 normal. The iron is oxidized, by introducing air or another oxidizing gas mixture, to form crystalline iron (III) oxide hydrate with a chemical composition of the formula Fe$_2$O$_3 \cdot $n H$_2$O, in which $1 \leq n \leq 2$. The iron (III) oxide hydrate produced is converted into magnetic iron oxide, $\gamma$-Fe$_2$O$_3$, by reduction and subsequent oxidation.

In the manufacture of acicular $\alpha$-FeOOH as a starting material for magnetic recording materials, the starting materials generally are (strongly) alkaline solutions. For example, air or oxygen is blown into a suspension of Fe(OH)$_2$ gel in 1 to 2.5 molar NaOH, for example, at temperatures between 0° and 60° C. to produce the desired acicular $\alpha$-FeOOH.

In the manufacture of goethite on a production scale, it is difficult to control particle growth and spontaneous nucleation. This is due to the very poor solubility of the $\alpha$-FeOOH (one liter comprises in equilibrium at $p_H = 14$ only $5 \cdot 10^{-11}$ g Fe$^{3+}$ besides solid $\alpha$-FeOOH). Accordingly, in the manufacture of goethite on a production scale an irreproducible, rather wide spectrum of particles sizes is found.

In order to produce magnetic powders having a coercive field strength as large as possible, the goethite particles should have a uniform structure and a pronounced acicularity. Moreover, in order to achieve an acceptable signal-to-noise ratio the particle sizes should fall within a narrow distribution. Particle assemblies manufactured to have optimum characteristics with respect to these criteria, are said to be thermodynamically "more monoenergetic" than particle assemblies manufactured without taking these criteria into account.

SUMMARY OF THE INVENTION

It is an object of the invention to provide a method by which particle assemblies of improved monoenergetic nature can be obtained.

According to the invention this object is achieved in a method of manufacturing acicular goethite as described above where electrolytic processes are used for oxidizing the starting iron (II).

The liquid of the suspension in which the electrolytic processes are carried out is preferably alkaline because only the most stable iron oxide hydrate modification $\alpha$-FeOOH is formed with sufficient alkalinity.

In an embodiment of the invention the oxidation to goethite occurs wholly or partly by a (preferably periodic) electrolysis process. The obtaining of more monoenergetic particles is particularly favored thereby.

The method according to the invention is preferably carried out so that the suspension of the poorly water-soluble iron (II) compound in the liquid consisting essentially of water is oxidized electrolytically by a periodically variable potential applied between two electrodes.

In order to minimize magnetite formation during purely electrolytic oxidation, and in order to prevent the reaction from ending asymptotically, it is advantageous to combine the electrolysis process with an oxidation by an oxidation agent, preferably an oxidizing gas or gas mixture.

According to an alternative embodiment of the invention the iron (II) compound is first oxidized entirely to goethite by an oxidation agent, preferably an oxidizing gas or gas mixture, and the suspension thus obtained is then subjected to an electrolytic after-treatment which preferably occurs periodically.

In order to produce a chromium doping which is advantageous in particular for iron powder manufactured from goethite, chromium-containing high-grade steel electrodes are preferably used for the electrolysis process.

The electrolytic oxidation provided by the invention is based on the reaction inertia of the cathodically-formed reaction products.

In order to suppress the formation of a coating layer on the electrodes, it is advantageous to periodically reverse the polarity of the applied electrode potential. The time period between the switching of the polarity is defined as the reversal period, $\Delta \tau_{um}$. Coating layer formation occurs when the reversal period is too long, although when the reversal period is too short, substantially no chemical reaction takes place.

This embodiment of the method according to the invention represents a gradient reversal method since the oxidation potential is periodically built up and broken down. This is to be distinguished from the case of the purely electrolytic oxidation and the case of the electrolytic oxidation in combination with an oxidation by an oxidation agent (for example oxidizing gas) to be supplied periodically from the outside.

DESCRIPTION OF THE PREFERRED EMBODIMENTS

Figure 1:
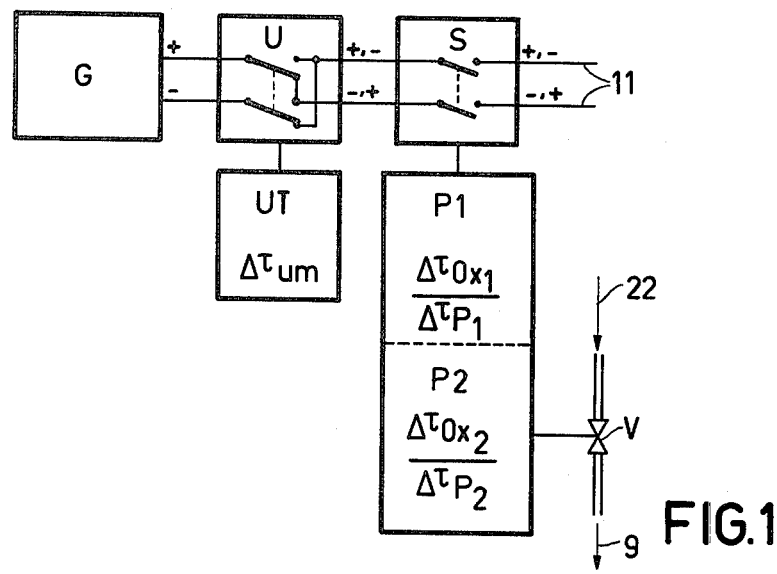
FIG. 1 is a schematic representation of a control unit for the time schedule of the process carried out in the device shown in FIG. 2.
Figure 2:
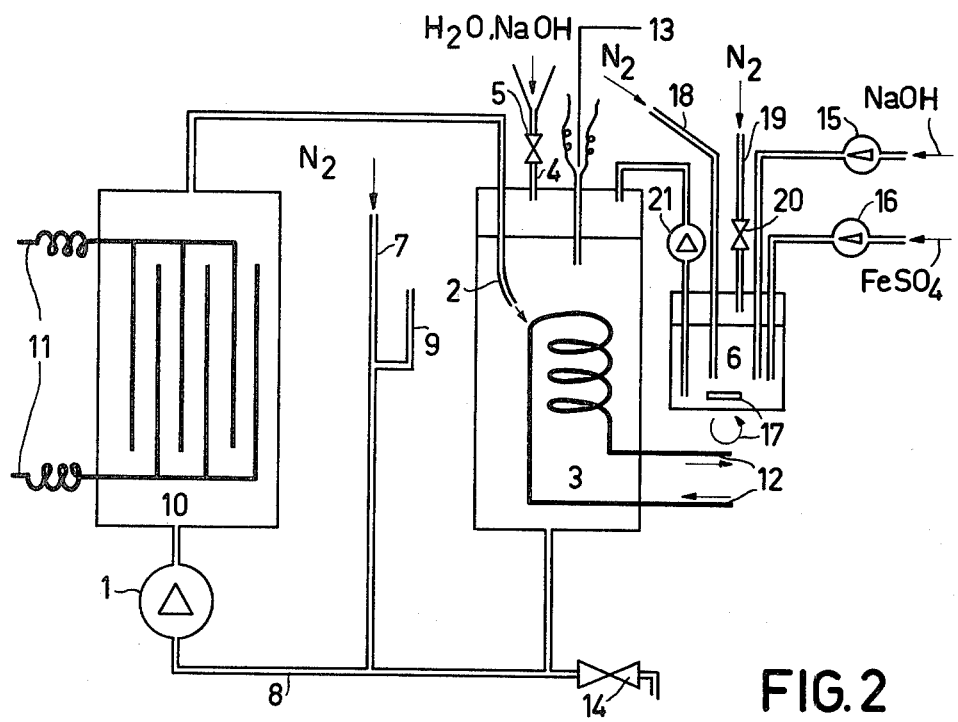
FIG. 2 shows schematically a device for carrying out a process according to the invention for forming goethite.
Figure 3:
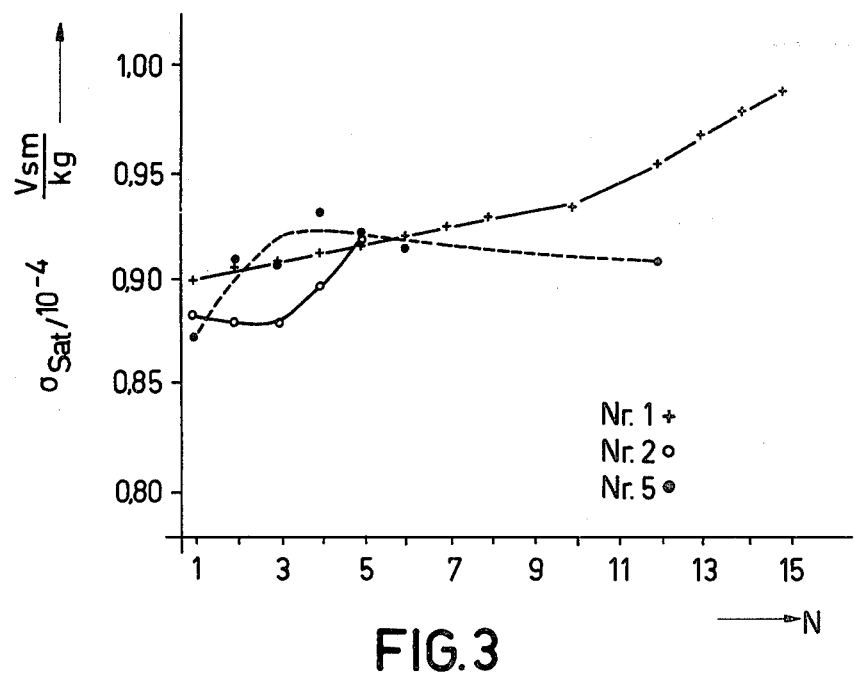
FIGS. 3 to 10 are graphs of the characteristic data of samples manufactured according to the invention.
Figure 4:
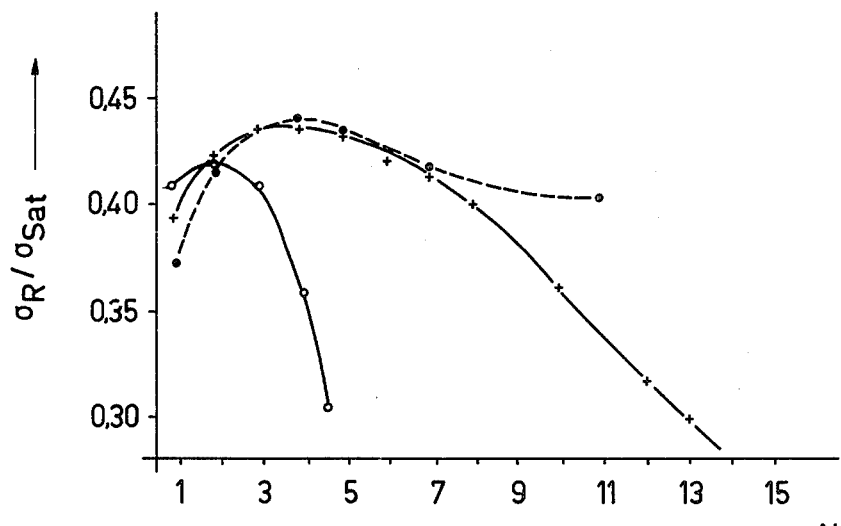
Figure 5:
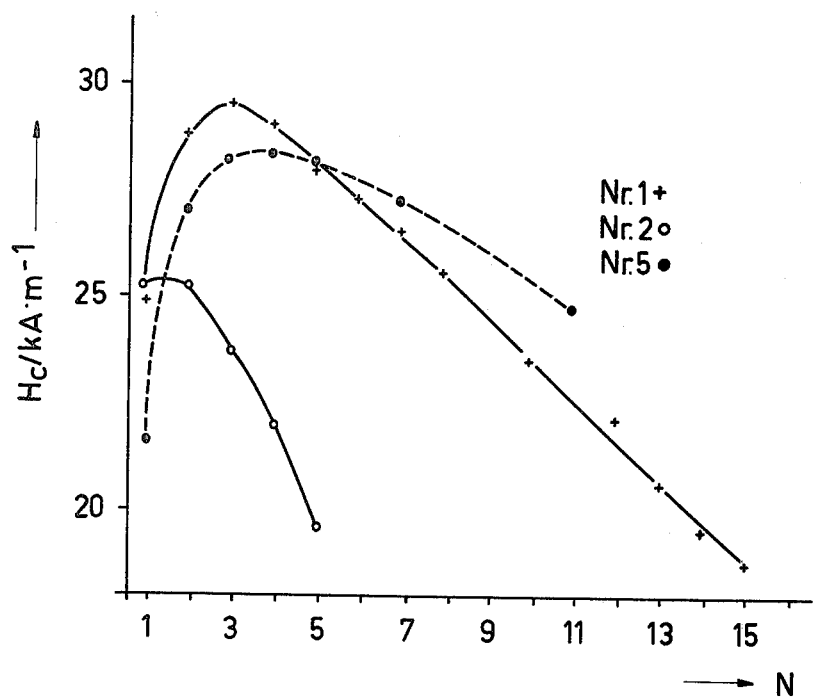
Figure 6:
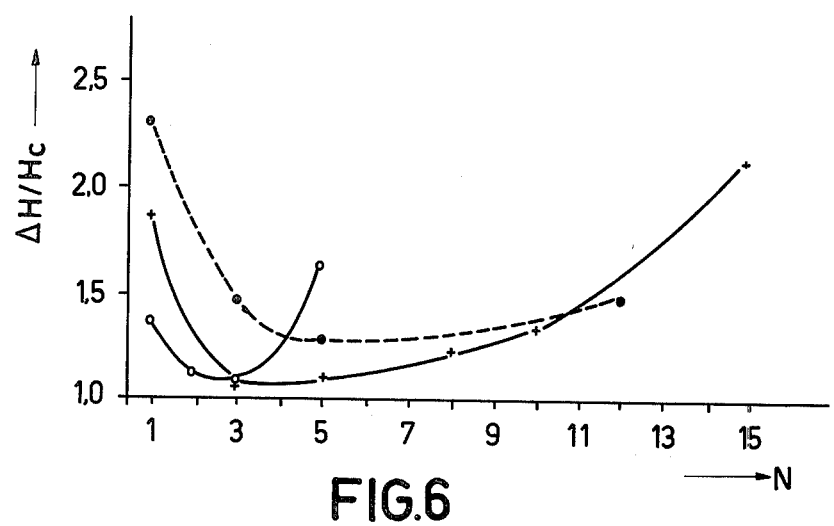
Figure 7:
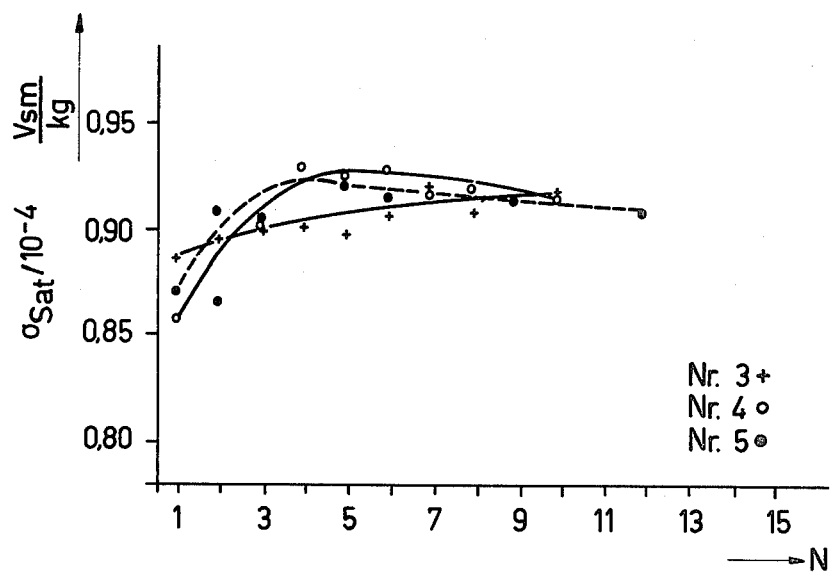
Figure 8:
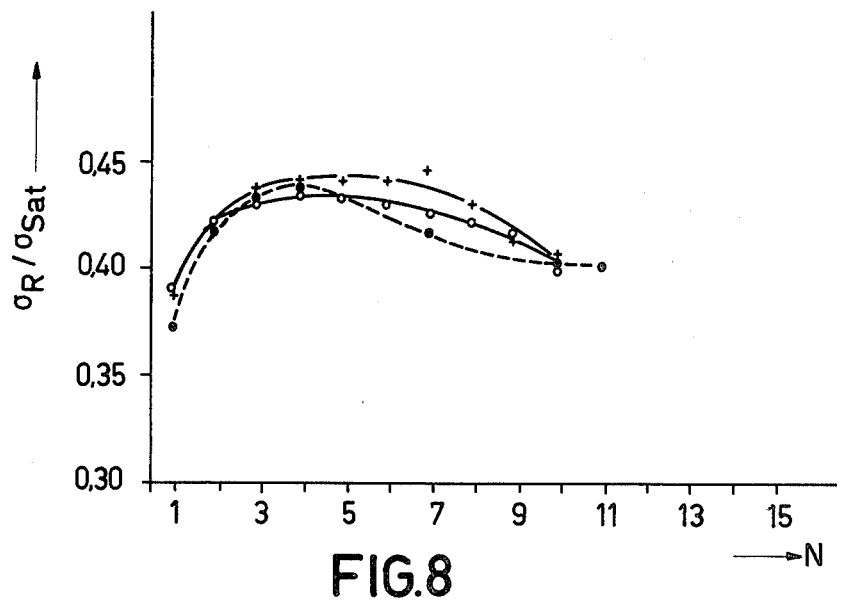
Figure 9:
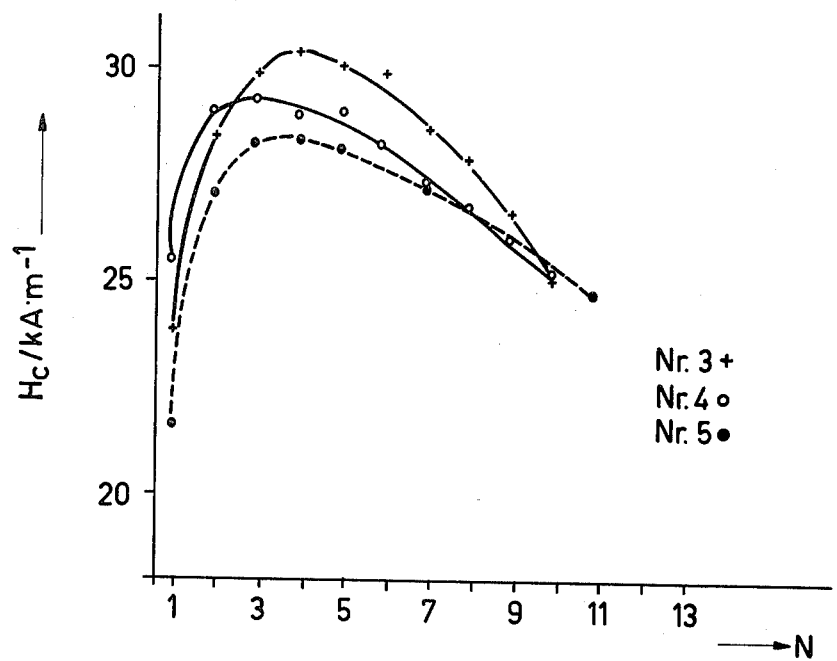
Figure 10:
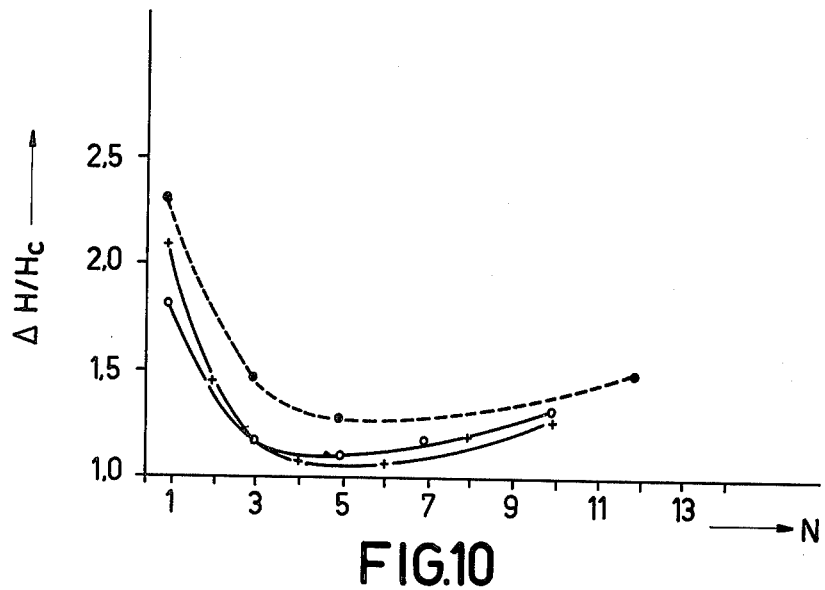

The control unit shown in FIG. 1 consists of a programmable direct current generator G. Generator G is connected to an electrode pair 11 (FIG. 2) via a polarity reversing device U and relay switch S. A polarity reversal ticker UT is connected to the polarity reversing device U. Connected to the relay switch S is a periodicity ticker (P1 and P2), whose part P1 controls the electrode current and whose part P2 controls the supply of oxidation agent. The part P2 of the periodicity ticker is connected to a valve V which is connected to an inlet tube 9 for an oxidation agent 22 (FIGS. 1 and 2).

The control unit generates the time intervals which are necessary for the reaction and which will be defined hereinafter.

In the case of the purely electrolytic oxidation (case 1) the time period $\Delta\tau_{ox1}$ that the electrolysis current is switched on and the succeeding period $\Delta\tau_{p1}$ that the current is interrupted together are referred to as reaction period $\tau = \Delta\tau_{ox1} + \Delta\tau_{p1}$. As regards the control times $\Delta\tau_{um}$, $\Delta\tau_{ox1}$, $\Delta\tau_{p1}$ and the reaction period the following side conditions efficaciously hold:

$$\Delta\tau_{ox1} \geqq \Delta\tau_{um}$$

For $\Delta\tau_{p1} = 0$ is $\tau = 2 \cdot \Delta\tau_{um} = \Delta\tau_{ox1}$ For $\Delta\tau_{ox} = 2 \cdot n \cdot \Delta\tau_{um}$ ($n = 1; 2; 3; \ldots$)

the polarity reversal occurs at the beginning of each reaction period $\tau$ in order to avoid coating layer formation, so that for the overall reaction time T the potential of the electrodes is substantially symmetrical:

$$\int_o^T dt \longrightarrow O \; U(t):$$

where U(t) is the electrolysis voltage, and represents the time period of an experiment (at the beginning of the experiment, t=0, and at the end of experiment, t=overall reaction time T).

In the case of the combination of the electrolytic oxidation with oxidation by an oxidation agent supplied periodically from the outside (case 2) the process is performed so that in each cycle the time intervals $\Delta\tau_{ox1}$ and $\Delta\tau_{p1}$ are followed by the time intervals $\Delta\tau_{ox2}$, during which the oxidation agent is added and the time interval $\Delta\tau_{p2}$ during which the oxidation process is again interrupted. For the reaction period in this case, $$\tau = \Delta\tau_{ox1} + \Delta\tau_{p1} + \Delta\tau_{ox2} + \Delta\tau_{p2}.$$

Both in the case of combined oxidation as in the case of purely electrolytic oxidation, the potential of the electrodes is to be maintained substantially symmetrical. The duration $t_i$ of a process step is given by the sum of the reaction periods within which the iron (II) containing starting compound is fully oxidized to $\alpha$-FeOOH.

An electrolysis process may also be coupled with an air or oxygen oxidation in such manner that in a first period $t_i$ Fe(OH)$_2$ is fully oxidized to goethite with air or oxygen, and the suspension is then subjected to an post-electrolysis treatment for the duration.

Suitable particles can most simply be obtained by means of a multi-step process in which the primary nucleation takes place essentially only in the first stage. In the subsequent stages the growth processes are predominant. In such a process the particles of each reaction stage form the substrate of the subsequent stage. After every complete oxidation of a reaction stage a given volume fraction (for example one tenth) of the homogeneous suspension is taken for purposes of examination. This taken volume part is replaced by a suspension of the same volume of the iron (II) containing starting compound to be oxidized. (For one extraction i=1; for two extractions i=2 etc. .).

The experiments were carried out in a device comprising approximately 25 liters of suspension (FIG. 2). A centrifugal pump or circulating pump 1 without a stuffing box ensures the circulation of the reaction mixture and produces a readily reproducible stirring by a tangential feed 2 in a reaction vessel 3 which makes a separate stirring device superfluous. The reaction components are supplied in the reaction vessel 3. The Fe(OH)$_2$ to be supplied per process step (usually 1 mol per step) is either precipitated directly in the reaction vessel 3 by the addition of NaOH via a pipe 4 having a valve 5, or is added as a suspension after previous precipitation in a separate vessel 6. The further details of the vessel 6 are described in Example II.

In order to prevent uncontrolled oxidation, a flow of nitrogen of approximately 30 liters per hour is introduced constantly via pipe 7 into the lower connection pipe 8 near the inlet nozzle of the circulating pump 1, as well as an oxidation agent (for example, air or oxygen) via the inlet pipe 9 in the case of the combined oxidation (case 2, see above).

The pump 1 ensures a good dispersion of the gases which leave the apparatus via the pipe 4 and the valve 5. Two packets 11 of high-grade steel sheets each of 1 m$^2$ area which function as electrodes are present in a vessel 10 in the left-hand part of the device and are connected to the control unit (FIG. 1). A thermostat 12 keeps the reaction temperature constant at 30° C. A Pt-calomel measuring electrode 13 serves for the potentiometric indication of the end of the reaction. A drain cock 14 serves for draining the goethite suspension.

Since the goethite nucleation is to begin only when the oxidation begins, it makes sense to slightly acidify the FeSO$_4$ solution with H$_2$SO$_4$ to 0.02 n and to stir before the beginning of the Fe(OH)$_2$ precipitation for some time under nitrogen with a quantity of reduced iron (ferrum reductum) sufficient for the reduction of the Fe+++ content. This applies in particular when iron powder is to be manufactured from the goethite.

The reaction volume is the same in all reaction steps.

EXAMPLE I

Goethite as a starting material for maghemite

The parameters of four experiments (numbers 1–4) carried out in the device according to FIG. 2 to produce goethite as a starting material for the maghemite production are summarized in Table 1. A comparative experiment (number 5) relates to chopped air oxidation.

TABLE 1

| Experiment | | No. 1 | No. 2 | No. 3 | No. 4 | No. 5** |
|---|---|---|---|---|---|---|
| Purely electrolytic oxidation | | + | + | − | − | − |
| Combined oxidation | | − | − | + | + | − |
| max. electrolysis voltage V | | 4 | 4 | 2 | 4 | − |
| voltage variation | | square wave | square wave | square wave | triangular | − |
| $\tau$ | s | 60 | 210 | 150 | 150 | 70 |
| $\Delta\tau_{ox1}$ | s | 60 | 90 | 90 | 90 | − |
| $\Delta\tau_{um}$ | s | 30 | 30 | 30 | 30 | − |
| $\Delta\tau_{p1}$ | s | − | 120 | 30 | 30 | − |
| $\Delta\tau_{ox2}$ | s | − | − | 5 | 5 | 10 |
| air flow rate | l/h | − | − | 30 | 30 | 30 |
| $\Delta\tau_{p2}$ | s | − | − | 25 | 25 | 60 |
| t* | h | ~22 | ~65 | ~20 | ~15 | ~5 |
| number of steps N | | 15 | 5 | 10 | 10 | 26 |

*average duration of a process step
**comparative experiment "chopped air oxidation without electrolysis"

In the experiments, first the 21 liters of deionized water in the vessels 3 and 10 was cleansed of dissolved oxygen by introducing nitrogen. Subsequently, the quantity of NaOH necessary for the preparation of a 1 n solution was added to the vessel 3.

Bypassing the vessel 6, the pumps 15 and 16 were connected directly to the reaction vessel 3 and 1 liter of 4 n NaOH and 1 liter of 1 molar FeSO$_4$ solution were supplied by the pumps.

In experiments Nos. 1 and 2 the oxidation occurred only by electrolysis (case 1). In experiment No. 2 current interruption times $\Delta\tau_{p1}$ were used as compared with experiment No. 1 in which they were not.

In experiments Nos. 3 and 4 the electrolytic oxidation was combined with air oxidation (case 2, see above). Experiments Nos. 3 and 4 can be distinguished only in the shape of the temporary voltage variation in the electrolysis process (square wave voltage in experiment No. 3, triangular voltage in test No. 4). In both experiments, the time integral within a period $\tau$ is the same.

After the end of the reaction, indicated potentiometrically by means of the measuring electrode 13, two liters of goethite suspension were removed via the outlet cock 14 for further processing. For the second and also for all subsequent process steps the extracted 2 liters of goethite suspension were replaced by 1 liter of 4 n NaOH via pump 15 and 1 liter of 1 m-FeSO$_4$ solution via pump 16.

In all the process steps of an experiment the oxidation was carried out in the same manner. From the 2 liter samples taken, the goethite was recovered by filtration, washing and drying.

In the electrolytic oxidation the solid reaction products were ocherous yellow, but show a stronger olive-green shade for each process step. Parallel thereto an increase in magnetic moment of the particles was observed without idiomorphous (die-shaped) magnetite depositions appearing electronmicroscopically.

The introduction of $\Delta\tau_{p1}$ in experiment No. 2 as compared with experiment No. 1 resulted in the measurement of significantly smaller specific areas with comparable process steps. Moreover, the particles in experiment No. 2 sedimented much more rapidly than in experiment No. 1. The relative sedimentation heights here were only half as large as in experiment No. 1.

In the case of purely electrolytic oxidation the potentiometrically indicatable reaction end-point is approached asymptotically. These difficulties and the possible undesired magnetite formation during the oxidation process can be avoided by a combination of electrolysis and air oxidation, as described in experiments Nos. 3 and 4.

For the manufacture of $\gamma$-Fe$_2$O$_3$, goethite samples (each 1 g) were first converted into hematite ($\alpha$-Fe$_2$O$_3$) by slowly heating at 370° C. under nitrogen. The $\alpha$-Fe$_2$O$_3$ was then reduced to magnetite (Fe$_3$O$_4$) at 370° C. in a nitrogen-hydrogen mixture (75:25% by volume). The oxidation step of the Fe$_3$O$_4$ is characterized by a clear minimum of the water vapor partial pressure (measured with a Panametrics hygrometer). When the water vapor partial pressure begins to increase again, the mixed gas is displaced by nitrogen and the sample is cooled to 200° C. At this temperature the Fe$_3$O$_4$ is converted into $\gamma$-Fe$_2$O$_3$ by a sufficiently slow increase of O$_2$.

The magnetic properties of magnetic powders for record carriers are essentially characterized by:
the specific saturation, $\sigma$sat,
the apparent relative remanence, $\sigma$R/$\sigma$sat,
the coercive field strength, H$_c$, and
the value $\Delta$H/H$_c$, wherein $\Delta$H is the half value width of the first derivative of the magnetic moment to the external field strength H$_A$ (which is a measure of the distribution function of the switching field strengths of the individual particles of the particle assembly).

The maghemite samples manufactured in the above-described manner were tested magnetically by means of a vibration sample magnetometer at room temperature (external saturation field H$_{Asat}$=1.63 MA/m). In FIGS. 3 to 10 the magnetic data of samples made in experiments Nos. 1 to 4 are shown together with those of samples made in a comparative experiment (chopped air oxidation without electrolysis).

EXAMPLE II

Goethite as a starting material for iron powder

Extensive investigations of the goethite manufactured demonstrated that in the experiments which led to the highest H$_c$ values of the resulting iron samples, these best values were already reached after the individual first process step. This behavior was confirmed both in the case of the electrolytic oxidation and in the case of the combined oxidation by electrolysis and air parameters for three.

Characteristic experimental data of three typical one-step experiments carried out in the apparatus shown in FIGS. 1 and 2 with electrolytic and combined oxidation, as well as parameters for two comparative experiments (chopped air oxidation without electrolysis) are presented in Table 2.

The experiments were carried out in a manner which corresponded to that described before in the manufacture of goethite for maghemite. However, in experiment No. 5 Fe(OH)$_2$ was produced in the vessel 6 via the pumps 15 and 16 by providing one liter of 6.6 n NaOH solution and one liter of 1.3 m FeSO$_4$ solution while stirring with a magnetic stirrer 17. The vessel 6 was provided in addition with a nitrogen inlet 18 and a nitrogen outlet 19 having a valve 20 so as to be able to avoid uncontrolled oxidation in the presuspension vessel 6. In test No. 4 the Fe(OH)$_2$ was suspended in the reaction vessel 3 with the same concentration ratios as in test No. 5 while avoiding the presuspension vessel 6.

TABLE 2

|  |  | No. 1 | No. 2 | No. 3 | No. 4 | No. 5 |
|---|---|---|---|---|---|---|
| One-step experiment goethite |  |  |  |  |  |  |
| NaOH |  | 1 n | 1 n | 1 n | 2 n | 2 n |
| mol/step FeSO$_4$ |  | 1 | 1 | 1 | 1.3 | 1.3 |
| Fe(OH)$_2$ suspension | separately | — | — | — | — | + |
|  | in reaction vessel | + | + | + | + | — |
| Method of oxidation | electrolysis  pure | + | + | — | — | — |
|  | air oxidation  combined | — | — | + | — | — |
|  | pure | — | — | — | + | + |
| max electrolysis voltage V |  | 4 | 4 | 4 | — | — |
| voltage variation |  | square wave | square wave | triangular | — | — |
| $\tau$ | s | 60 | 210 | 150 | 65 | 65 |
| $\Delta\tau_{ox1}$ | s | 60 | 90 | 90 | — | — |
| $\Delta\tau_{um}$ | s | 30 | 30 | 30 | — | — |
| $\Delta\tau_{p1}$ | s | — | 120 | 30 | — | — |
| $\Delta\tau_{ox2}$ | s | — | — | 5 | 5 | 5 |
| air flow rate | l/h | — | — | 30 | 40 | 40 |
| $\Delta\tau_{p2}$ | s | — | — | 25 | 60 | 60 |
| t$_1$ | h | 23 | 56 | 16 | 8.7 | 8.2 |
| specific area (BET) | m$^2$/g | 60 | 45 | 66 | 56 | 71 |
| Passivated iron powder |  |  |  |  |  |  |
| $\sigma_{max}$ | 10$^{-4}$ Vsm/kg | 1.92 | 1.78 | 1.81 | 1.85 | 1.91 |
| $\sigma_R/\sigma_{max}$ |  | 0.46 | 0.43 | 0.48 | 0.48 | 0.49 |
| H$_c$ | kA/m | 103.4 | 88.8 | 112.8 | 105.8 | 112.3 |
| $\Delta$H/H$_c$ |  | 1.40 | 1.82 | 1.19 | 1.15 | 1.13 |

The reduction of the goethite samples thus manufactured to iron was carried out in the same device as in the case of maghemite. The goethite was converted into hematite by slow heating at 350° C. under nitrogen. Reduction at 350° C., with H$_2$:N$_2$ mixed gas or pure hydrogen, to iron was then carried out. The end of the reaction was detected via the water vapor partial pressure. After cooling under nitrogen to room temperature the obtained pyrophoric iron powder was passivated by an appropriate slow increase in the addition of oxygen. In the reduction of larger quantities of the same goethite samples in a reduction device twenty times larger up to 5% higher H$_c$ values of the corresponding iron samples are generally observed.

As appears from the magnetic data of the passivated iron powders in Table 2, magnetic properties which are more favorable are obtained with a suitable combination of electrolysis and air oxidation (experiment No. 3) than in the case of pure electrolytic oxidation (experiments Nos. 1 and 2). The iron powder obtained in experiment No. 3 has similarly good magnetic properties as the iron powder obtained in the comparative experiment Nos. 4 and 5, which were manufactured by means of the method of chopped air oxidation. Electronmicroscopic photographs of the samples, however, show that after a combined oxidation process both the goethite needles and the iron particles manufactured therefrom are only half as long as the corresponding particles of the comparative samples Nos. 4 and 5. Such less acicular powders are favorable especially in magnetic lacquer systems in the manufacture of carriers for magnetic recording and playback of data, audio and video signals due to the better dispersion ratio and higher filling factors.

During the electrolytic oxidation process the goethite particles consume a small quantity of chromium, but substantially no nickel from the high-grade steel electrodes.

The consumed quantity of chromium in experiment No. 1 was 0.3% by weight and was 0.13% by weight in experiment No. 3. In the comparative experiments Nos. 4 and 5 no chromium consumption can be demonstrated from the high-grade steel electrodes to which no voltage was applied in the experiments (the analyzed chromium and nickel content on the order of magnitude of 0.01% corresponds to the impurities of the starting products).

The chromium consumed by the goethite might be the cause of the above-described particular properties of the samples obtained in experiment No. 3 due to its nonreducibility by hydrogen.

The chromium content of goethite samples which were manufactured purely electrolytically or by combined oxidation decreases with increasing number of steps. The chromium contents were, for example:

Experiment No. 1 of Table 1 in the first process step: 0.3% by weight

Experiment No. 1 of Table 1 in the 15$^{th}$ process step: 0.05% by weight

Experiment No. 4 of Table 1 in the 1$^{st}$ process step: 0.11% by weight

Experiment No. 4 of Table 1 in the 10$^{th}$ process step: 0.04% by weight

Surprisingly, a chromium consumption of the goethite is observed not only in the electrolytic oxidation process, but also when a goethite suspension oxidized completely already by air oxidation is subjected to postelectrolysis. In the experiments recorded in Table 3 with postelectrolysis, the initial product Fe(OH)$_2$ was manufactured by separate presuspension of 1.3 mol FeSO$_4$ in 2 n NaOH and was further processed in the manner described above. After complete oxidation, and goethite samples were subjected to a postelectrolysis as indicated in Table 3. Both goethite samples oxidized completely by air or oxygen and goethite samples modified by postelectrolysis were converted into passivated iron powder in the manner already described. The following characteristics were measured:

TABLE 3

| | One-step experiments with post-electrolysis | | | | | |
|---|---|---|---|---|---|---|
| | No. 5 | | No. 6 | | No. 7 | |
| | oxidation conditions | post-electrolysis | oxidation conditions | post-electrolysis | oxidation conditions | post-electrolysis |
| Goethite | | | | | | |
| oxidation agent  air | + | — | + | — | — | — |
| oxygen | — | — | — | — | + | — |
| flow rate  l/h | 40 | — | 80 | — | 50 | — |
| $\tau$  s | 65 | — | 65 | — | 65 | — |
| $\Delta\tau_{ox2}$  s | 5 | — | 5 | — | 5 | — |
| $\Delta_{p2}$  s | 60 | — | 60 | — | 60 | — |
| $t_1$  h | 8.2 | — | 5 | — | 1.25 | — |
| max electrolysis voltage V | — | 4 | — | 4 | — | 4 |
| voltage variation | — | square wave | — | square wave | — | square wave |
| $\tau$ post-electrolysis s | — | 60 | — | 60 | — | 60 |
| $\Delta\tau_{um}$, post-electrolysis s | — | 30 | — | 30 | — | 30 |
| $t_1$, post-electrolysis h | — | 19 | — | 16 | — | 19 |
| chromium content wt. % | ~0.01 | 0.25 | ~0.01 | 0.75 | ~0.01 | 0.49 |
| passivated iron powder | | | | | | |
| $\sigma_{max}$  $10^{-4}$ Vsm/kg | 1.91 | 1.86 | 2.31 | 1.49 | 2.00 | 1.70 |
| $\sigma_R/\sigma_{max}$ | 0.49 | 0.48 | 0.36 | 0.42 | 0.42 | 0.42 |
| $H_c$  kA/m | 112.3 | 111.7 | 71.0 | 100.6 | 80.5 | 85.7 |
| $\Delta H/H_c$ | 1.13 | 1.19 | 2.34 | 1.50 | 2.25 | 2.10 |

In goethites which are processed to form iron powders with very good magnetic properties (experiment No. 5) a certain chromium consumption is found as a result of the postelectrolysis. This varies the magnetic properties of the passivated iron powders manufactured therefrom only negligibly. In goethites which are processed to form iron powders with significantly poorer magnetic properties (experiments Nos. 6 and 7) the postelectrolysis produces a noticeable higher chromium consumption and in the corresponding iron preparations a significant improvement of the magnetic properties.

What is claimed is:

1. A method of manufacturing acicular goethite comprising the steps of:
   providing a suspension of an iron(II)-containing compound in a liquid consisting essentially of water, said iron(II)-containing compound having a low water solubility;
   oxidizing the suspension to form acicular goethite crystals; and
   filtering off, washing, and drying the acicular goethite crystals;
   characterized in that the step of oxidizing the suspension includes electrolytically oxidizing the suspension.

2. A method as claimed in claim 1, characterized in that the liquid of the suspension is alkaline.

3. A method as claimed in claim 2, characterized in that the step of oxidizing the suspension consists entirely of electrolytically oxidizing the suspension.

4. A method as claimed in claim 2, characterized in that the electrolytic oxidation step is repeated periodically.

5. A method as claimed in claim 4, characterized in that the step of oxidizing the suspension includes both electrolytic oxidation and oxidation by an oxidizing agent.

6. A method as claimed in claim 5, characterized in that the oxidizing agent is an oxidizing gas mixture.

7. A method as claimed in claim 6, characterized in that the electrolytic oxidation step is performed by inserting high-grade steel electrodes in the suspension.

8. A method as claimed in claim 7, characterized in that the high-grade steel electrodes contain chromium.

9. A method as claimed in claim 2, characterized in that the step of oxidizing the suspension includes both electrolytic oxidation and oxidation by an oxidizing agent.

10. A method as claimed in claim 9, characterized in that the oxidizing agent is an oxidizing gas mixture.

11. A method as claimed in claim 10, characterized in that the electrolytic oxidation step is performed by inserting high-grade steel electrodes in the suspension.

12. A method as claimed in claim 11, characterized in that the high-grade steel electrodes contain chromium.

13. A method as claimed in claim 2, characterized in that the electrolytic oxidation step is performed by inserting high-grade steel electrodes in the suspension.

14. A method as claimed in claim 13, characterized in that the high-grade steel electrodes contain chromium.

15. A method as claimed in claim 1, characterized in that the electrolytic oxidation step comprises:
   inserting two electrodes into the suspension; and
   applying an electric potential across the electrodes, said potential periodically being reversed in its polarity.

16. A method as claimed in claim 1, characterized in that the step of oxidizing the suspension comprises:
   first oxidizing the suspension completely by an oxidizing agent to form a suspension of acicular goethite; and then
   electrolytically oxidizing the suspension of acicular goethite.

17. A method as claimed in claim 16, characterized in that the electrolytic oxidation of the suspension of acicular goethite is repeated periodically.

18. A method as claimed in claim 17, characterized in that the oxidizing agent is an oxidizing gas mixture.

19. A method as claimed in claim 18, characterized in that the electrolytic oxidation step is performed by inserting high-grade steel electrodes in the suspension.

20. A method as claimed in claim 19, characterized in that the high-grade steel electrodes contain chromium.

* * * * *